Feb. 8, 1955 S. W. ALDERSON 2,701,370

PROSTHETIC DEVICE

Filed Dec. 7, 1953 7 Sheets-Sheet 1

INVENTOR
SAMUEL W. ALDERSON
BY John A. Hall
ATTORNEY

INVENTOR
SAMUEL W. ALDERSON
BY John A. Hall
ATTORNEY

Feb. 8, 1955 S. W. ALDERSON 2,701,370

PROSTHETIC DEVICE

Filed Dec. 7, 1953 7 Sheets-Sheet 3

INVENTOR
SAMUEL W. ALDERSON
BY John A. Hall
ATTORNEY

INVENTOR
SAMUEL W. ALDERSON
BY John A. Hall
ATTORNEY

PROSTHETIC DEVICE

Filed Dec. 7, 1953 7 Sheets-Sheet 5

INVENTOR
SAMUEL W. ALDERSON
BY
[signature]
ATTORNEY

INVENTOR
SAMUEL W. ALDERSON
BY John A. Hall
ATTORNEY

INVENTOR
SAMUEL W. ALDERSON
BY John W. Hall
ATTORNEY 2,701,370

PROSTHETIC DEVICE

Samuel W. Alderson, Westport, Conn.

Application December 7, 1953, Serial No. 396,520

40 Claims. (Cl. 3—1.1)

The present invention is a continuation in part of the inventions disclosed in my application Serial Number 273,865 and my application Serial Number 273,866 both filed February 28, 1952, and both for improvements in prosthetic devices and both now abandoned.

This invention relates to prosthetic devices and particularly to power driven artificial limbs.

The object of the invention is to provide means whereby an amputee may produce comparatively powerful movements of the actuators of an artificial limb with comparatively little effort and in general with natural movements of parts of the body.

The invention consists of the combination of an articulated limb, a source of power, motor means for converting power from said source into movement, reduction gearing, a plurality of actuators such as a finger and thumb actuator, a wrist pronation and supination actuator, a dorsal and volar wrist flexion actuator, clutch means for applying movement from said motor means to said actuators either singly or in combination, locking means for holding any part in any position to which it has been driven and means whereby an amputee may at will control these devices. The device is characterized by the use of control devices which upon operation simultaneously operate electrical switches and means for the mechanical engagement of clutches to selectively transmit the motion of the motor to given actuators.

The characteristic feature of the present invention is that the device as a whole consists of a plurality of units or parts bearing no fixed spatial relation to each other. There is an artificial hand containing the three actuators above mentioned which is operated from a transmission unit through the medium of flexible shafts whereby the transmission unit may be mounted at any convenient location through the proper adjustment of the lengths of said flexible shafts. Likewise the motor may be located at any other convenient position and its cooperative association with the transmission unit fixed by the proper adjustment of the length of a flexible shaft and certain electrical connections extending therebetween. The body control means through which the amputee controls this prosthetic device may be located at any convenient position and the cooperative association between them and the transmission unit fixed by the proper adjustment of the length of control cables and drag links and finally the source of power may be located at any convenient position and its cooperative association with the said transmission unit and the said motor fixed by the adjustment of the length of the electrical connections extending therebetween. Thus the prosthetic device of the present invention is essentially flexible in nature so that it may be custom fitted to each amputee.

The invention comprehends the general combination of a motor, a transmission device, joint actuators and the use of flexible shafts therebetween. It includes the use of a worm and gear for each actuator and features the use of a separate multiple disc clutch having certain unique constructional details for each. The invention involves a combination of control means which may be operated either separately or simultaneously and whereby compound movements may be produced. Certain unique details of construction involving curvature adjustable to the wearer for the purpose of rendering the device comfortable to the amputee and unnoticeable to the onlooker are provided. A movable stump bucket with several means for adjustment is provided for translating slight natural movements into control of the pronation and supination means and in line with the effort to streamline the device for the benefit of the appearance of the amputee a unique offset arrangement of the stump bucket is provided. A unique switching arrangement for operating certain of the joint actuators in either a forward or a backward direction by different degrees of the same effort by the amputee is provided, including compensating means for rendering involuntary flexion of a muscle in the same direction ineffective to operate such means. A novel and specific mounting plate, hinged to ride on a muscle for controlling the operation of the electrical switches and the clutches and particularly for differentiating between voluntary and involuntary flexion thereof is provided. This last means constitutes a selective operation to differentiate between a voluntary and an involuntary flexion of a muscle. A unique construction involving levers of different length for operating the electrical switches by different degree efforts is featured. Means are provided whereby the device may be made to execute movements by natural efforts and not by many of the entirely artificial and unrelated contortions associated with prosthetic devices. Specific means for producing pronation and supination of the hand by an actual and natural movement of pronation of the amputee's stump are provided. Means are provided for setting up a sensory barrier for notifying the amputee that further effort in the same direction will produce a different movement. Safety means in the form of overload compression springs for prevention of the stalling of the motor are provided with means for adjustment thereof. Means for control by fixed or by ballistic movements are provided. Means for the selective response to fixed and ballistic operations and a means for exaggerating the difference therebetween is provided. A unique electrical switching circuit for placing the motor reversing switch in dominant control is provided. A means for producing a predictable module of motion and for maintaining such module of motion within a practical limit of error is provided. Means for modular control of the device whereby the amputee may execute small and precise movements of the device without hunting is provided. A means for correlating the force produced in a joint actuator to the force exercised by the amputee is provided whereby reality in operation is produced. The control means for each joint actuator terminates in a preloaded spring operating over a predetermined range and a predetermined pressure. A shoulder cap actuated device is employed for both mechanically operating a clutch and for controlling an electric circuit.

The drawings consist of seven sheets having twenty-six figures, as follows.

Fig. 1 is a back view of the prosthetic device of the present invention shown fitted on the shoulder and right arm of an amputee and showing the general location of the components of the device, that is, the motor and gear box mounted on the upper section of the harness, the transmission mounted on the forearm section, the artificial hand and the cable and sheath device for operating the wrist actuator, the cable being attached to the left shoulder cap and the sheath being attached to the right shoulder cap;

Figure 4:
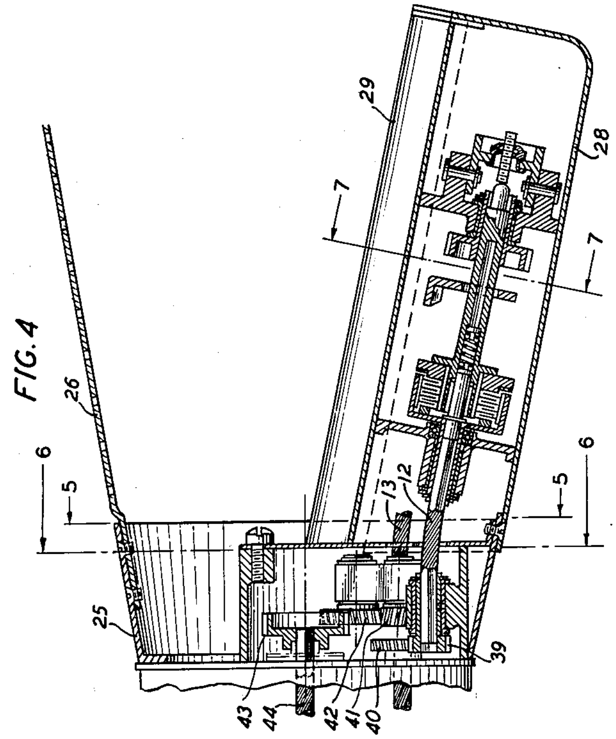
Fig. 4 is a sectional view of the transmission device and the gear box placed between the transmission and the artificial hand taken on the line 4—4 of Fig. 6.
Figure 7:
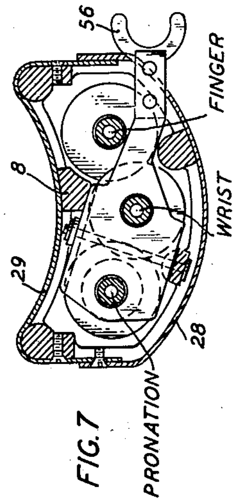
Figure 10:
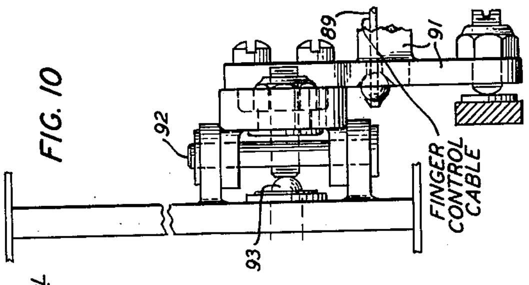
Figure 8:
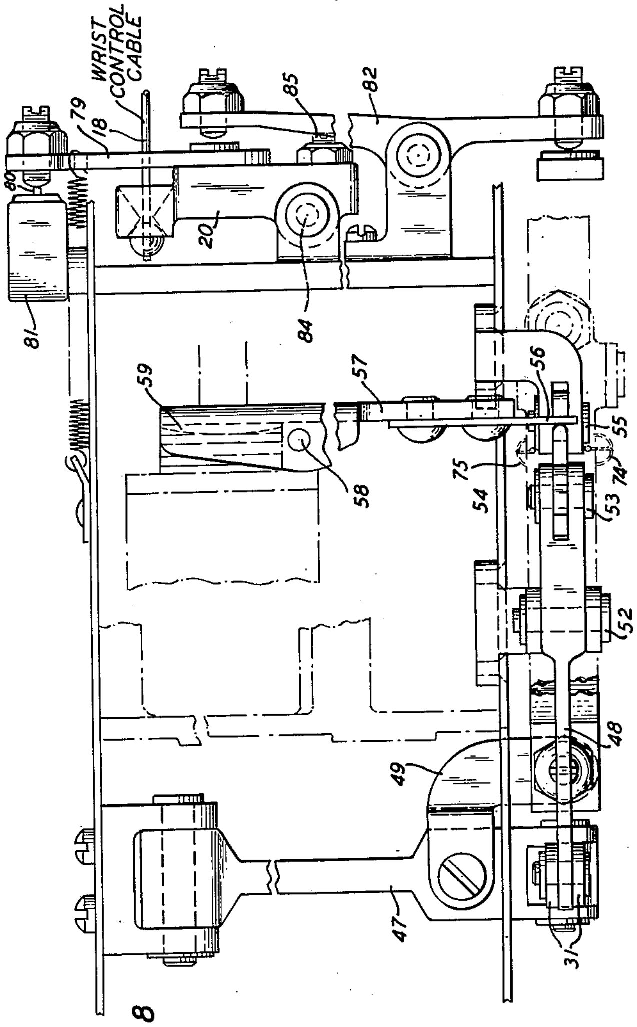
Figure 9:
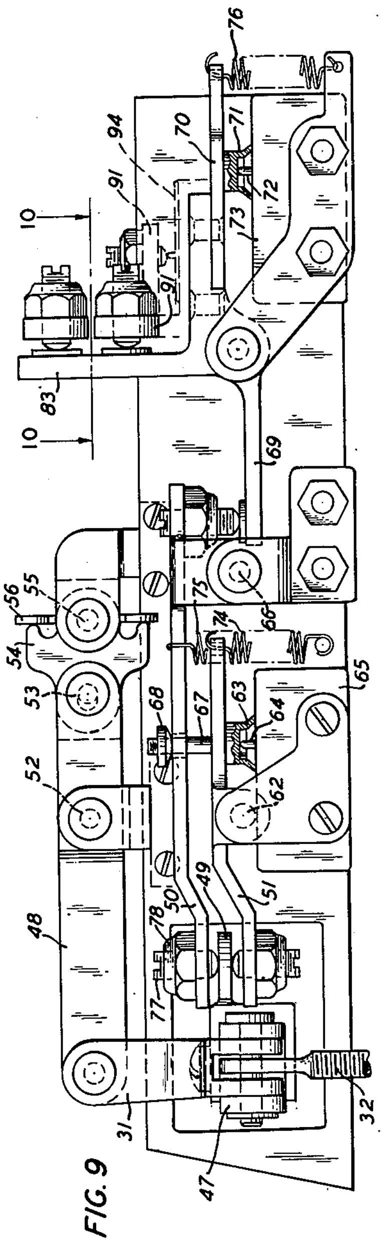
Figures 11, 12, 13, 14:
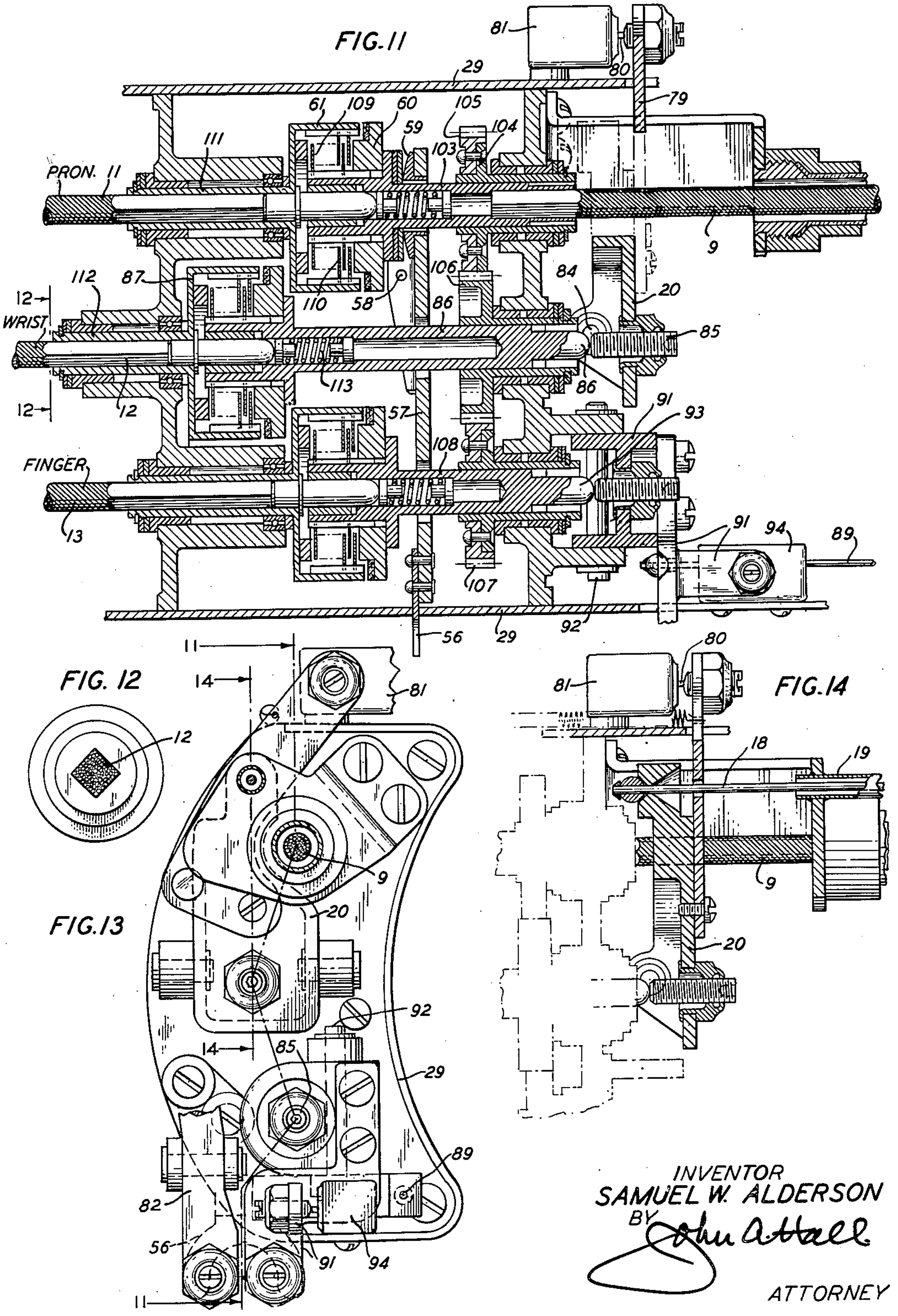
Figure 15:
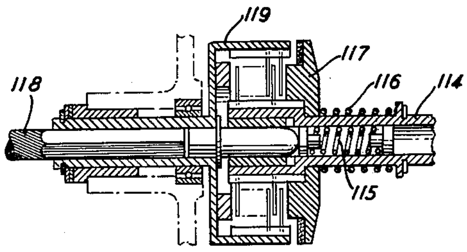
Figure 16:
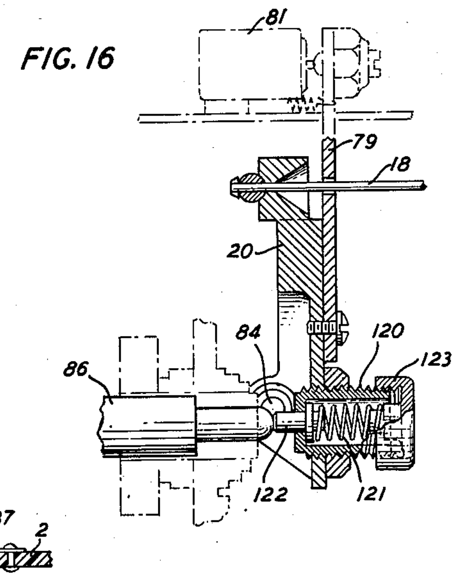
Figure 17:
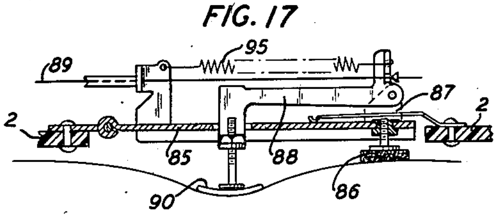
Figure 18:
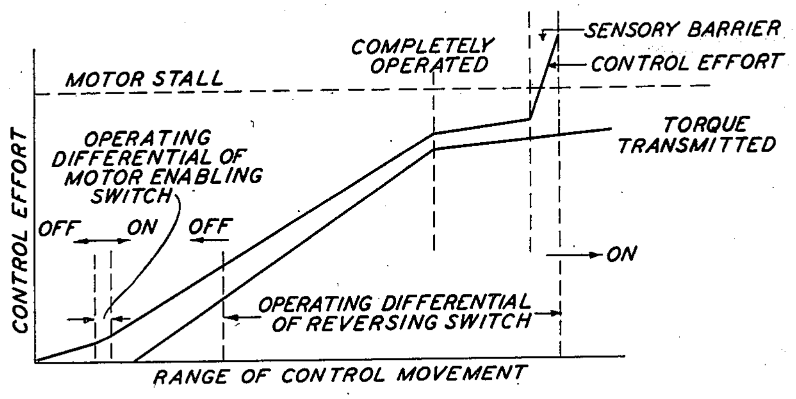
Figure 19:
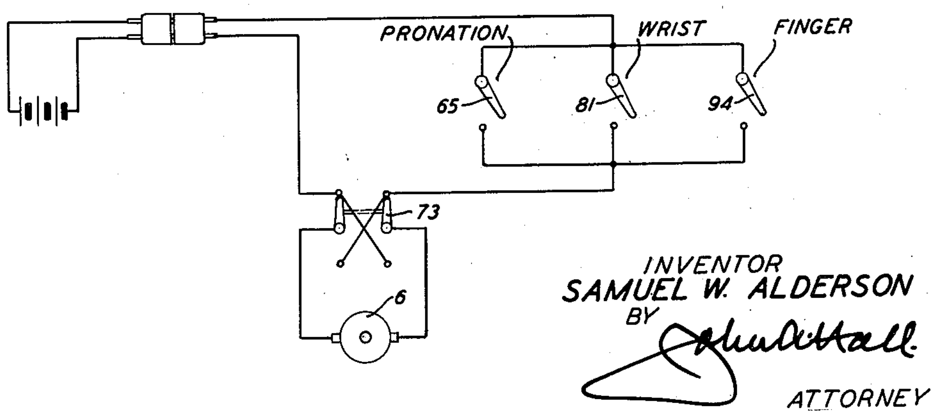
Figure 20:
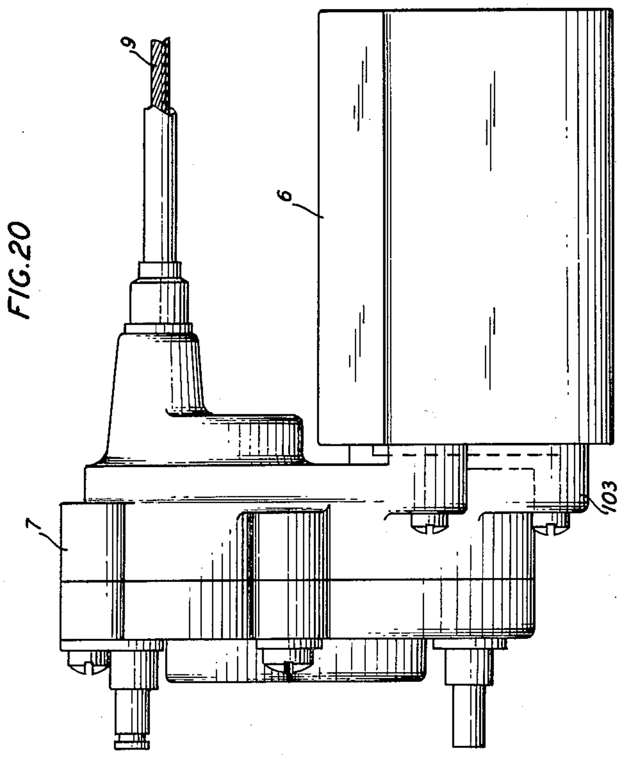
Figure 24:
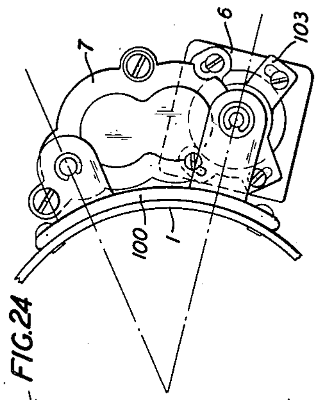
Figure 23:
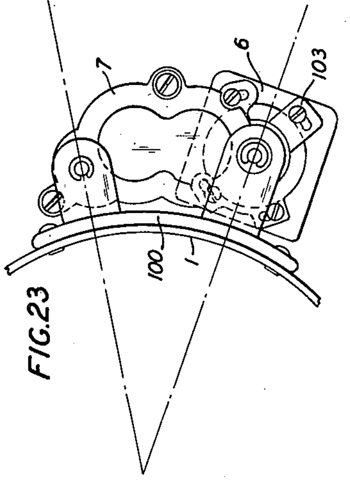
Figure 21:
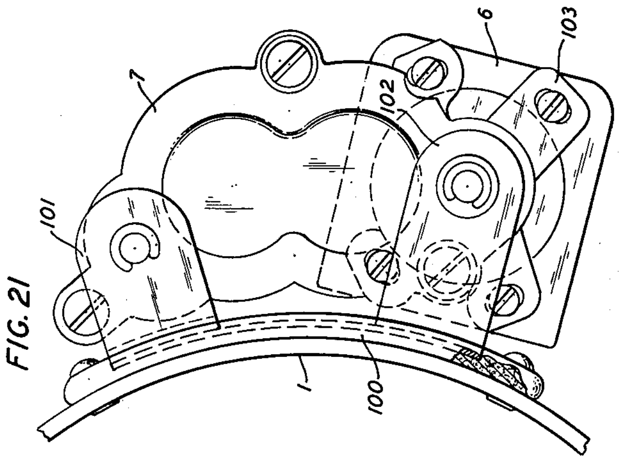
Figure 22:
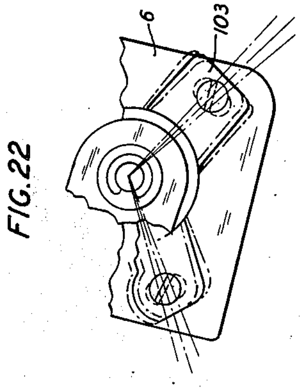
Figure 25:
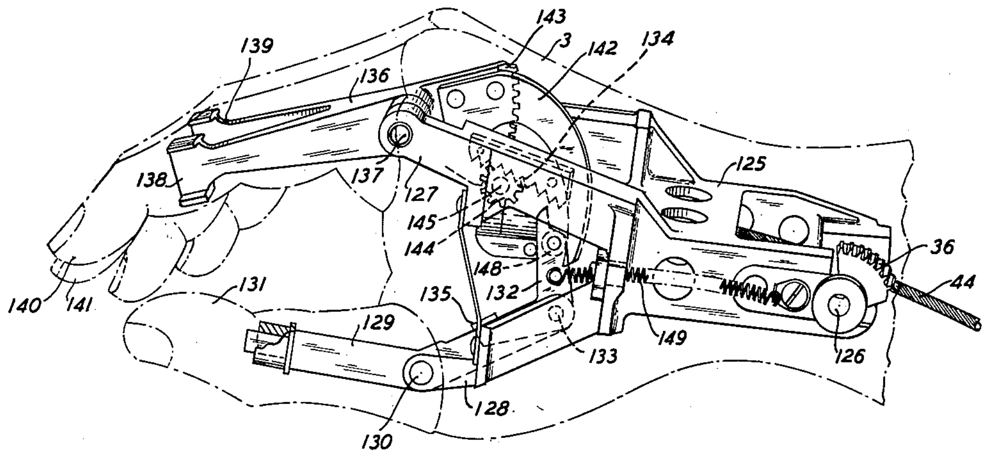
Figure 26:
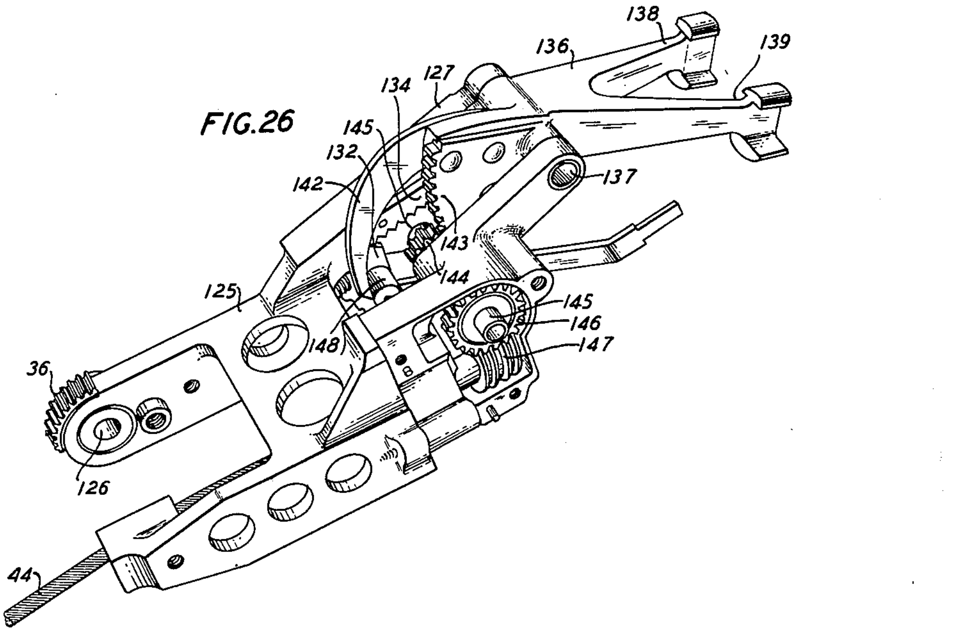

Fig. 7 is a sectional view of the transmission unit taken on the line 7—7 of Fig. 4 and showing particularly the internal shafts leading from the control levers to the multidisc clutches thereof;

Fig. 8 is a top view partly in outline showing the construction and placement of the operating levers of the transmission device and the electrical switches operated thereby, whereby control efforts of the amputee may be translated into the simultaneous operation of the electrical circuit of the device and one or more of the multidisc clutches thereof;

Fig. 9 is a side view of the transmission unit showing particularly the levers operated by the pronation and supination control means as well as the lever for operating the reversing switches;

Fig. 10 is a top view partly in section taken on the line 10—10 of Fig. 9 showing particularly the lever controlled by the finger control cable;

Fig. 11 is a sectional view of the transmission device taken on the line 11—11 of Fig. 13;

Fig. 12 is a sectional view taken on the line 12—12 of Fig. 11 showing the manner in which the flexible cable is squared for insertion in an appropriately squared aperture in the output shaft of one of the multidisc clutches;

Fig. 13 is an end view of the transmission device of Fig. 11 looking from the right thereof;

Fig. 14 is a fragmentary sectional view taken on the line 14—14 of Fig. 13 and showing in some detail the lever controlled by the wrist cable;

Fig. 15 is a sectional view of the multidisc clutch such as the three shown in Fig. 11 but illustrating an alternative construction thereof whereby an additional spring means for providing a more sensitive sensory barrier is provided;

Fig. 16 is a sectional view similar to that of Fig. 14 showing an alternative arrangement whereby an adjustable spring for providing a sensory barrier is mounted on the end of the lever bearing on the multidisc clutch shaft;

Fig. 17 is a sectional view of a muscular control device showing the manner in which such device is mounted on a hinged plate bearing on the muscle in such manner that the actuating part thereof will respond only to conscious flexion of the muscle, and indicating schematically the manner in which the control cable is tensed;

Fig. 18 is a graph showing how advantage is taken of the operating differentials of the various switches to afford modular control of the device and illustrating the manner in which the sensory barrier is developed for signaling the amputee;

Fig. 19 is a schematic wiring device of the electrical system of the device;

Fig. 20 is a side view of the motor and gear box;

Fig. 21 is an end view of the same;

Fig. 22 is a fragmentary sketch of a part of the device shown in Fig. 21 illustrating the manner of adjustably mounting the gear box on the motor;

Fig. 23 is a schematic showing of Fig. 21 in which the adjustment of the gear box and motor has been made to fit over a well developed arm;

Fig. 24 is a similar view showing the adjustment made to fit over a compartively thin arm;

Fig. 25 is a perspective view of a thumb and finger mechanism designed to show in some detail a joint actuator; and Fig. 26 is another perspective view of this same device taken from another view point in order to clearly show the manner in which such joint actuator is controlled by a worm and gear device terminating a flexible shaft.

The prior art may in general be represented by Patent Number 2,528,464 granted to V. O. Wilkerson et al., October 31, 1950, and Patent 2,580,987 granted to S. W. Alderson, January 1, 1952. The Alderson patent discloses a power driven electrically operated artificial arm showing many details of gears and shaftings incorporated in an artificial arm and constituting a forerunner in the development of the present device. The Wilkerson patent shows in particular a thumb and finger mechanism operated hydraulically and which constitutes a forerunner in the development of the present joint actuator disclosed herein.

The invention may be said to reside in the cooperative assembly of a plurality of separate devices interconnected by electrical conductors, flexible shafts and control cables, none of which has any critical length but which may be adjusted for custom fitting of the device to each particular amputee. In general the device consists of a harness comprising a leather or plastic upper arm and shoulder fitting 1, a forearm stiff plastic section 2, and an artificial hand 3. The harness also includes an upper arm and shoulder cap 4 for the amputee's other shoulder and these portions of the harness are appropriately strapped in the manner well known in this art. Such strapping is here indicated by the single strap 5, though it will be clearly understood that other strapping will be employed to suit the amputee. The motor 6 and gear box 7 are shown as mounted on the rear portion of the upper arm section of the harness and associated with the transmission unit 8 by a flexible shaft 9. In practice this shaft 9 will be enclosed in a flexible sheath 10 so that the motion of the shaft will not interfere with the clothing of the amputee. Three flexible shafts 11, 12 and 13 are indicated in outline as extending from the transmission unit 8 into the mechanism of the artificial hand 3, to operate the pronation and supination joint actuator, the wrist flexion actuator and the finger and thumb actuator respectively. The flexible upper arm section is shown strapped to the amputee's upper arm by the two straps 14 and 15 and pivotally secured to the forearm section at the points 16 and 17. A control cable 18, attached to the left shoulder cap 4 may be tensed by a shoulder movement by the amputee and by the use of a sheath 19 may be caused to operate a given control lever 20 on the transmission unit whereby the motor may be started in motion and the appropriate multidisc clutch operated to impart the motion of the motor to the wrist flexion actuator through the flexible shaft 12.

A feature of the present invention is the use of a movable stump bucket 21 secured by a shaft 22 journalled into a bearing 23 affixed to the forearm section 2. A compressible spring 24 is provided to hold the stump bucket 21 more or less firmly against the amputee's stump and serves as means to compensate for apparent foreshortening of the stump as the elbow is bent. It is to be noted that the stump bucket 21 herein is shown in nicely moulded symmetrical form. In actual practice this stump bucket is custom fitted to the particular amputee by the actual moulding of plastic material to the stump and in practice often assumes an irregular form whereby there will be no slippage between the stump and the stump bucket even when practically lubricated by sweat while in use.

The forearm section 2 is secured to a sleeve portion 25 of the artificial hand 3, by one or more straps such as the strap 26 and by a cover 28 for the transmission unit 8. It is to be noted particularly, as shown in Fig. 3, that for the sake of symmetry and to simulate the normal appearance of a clothed arm that the center line 26 of the stump bucket 2 is set off from the center line 27 of the clothed forearm and the wrist of the artificial hand.

Figure 3:
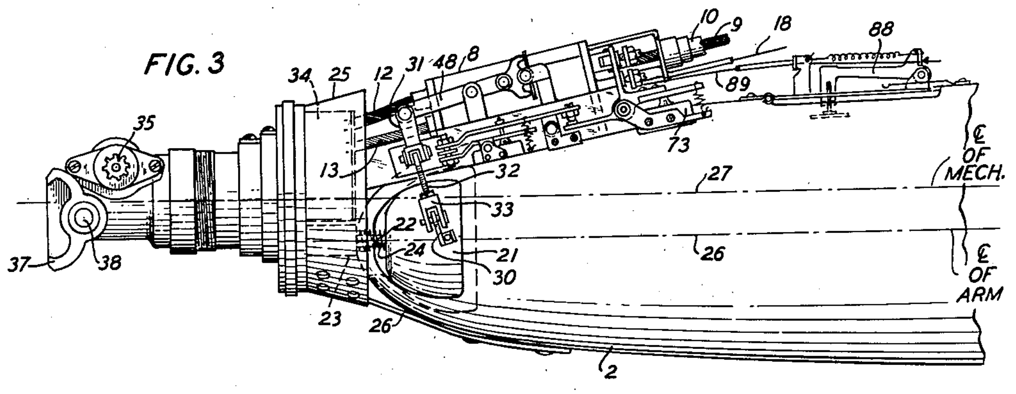
Fig. 3 is a side view of the forearm section showing the manner in which the transmission device is mounted, some details of the structure within the wrist portion of the artificial hand and illustrating the off center line mounting of the forearm section whereby the general appearance of the clothed forearm of the device will simulate a natural arm.

A base portion 29 for the transmission unit constituting, along with the cover 28, an enclosure therefor is secured (by means not shown) to the forearm section 2 generally in the position shown in Fig. 3.

A bracket 30 is secured to the stump bucket 21 and is employed to impart motion of such stump bucket to the operating lever 31 of the transmission unit. A drag link consisting of a threaded portion 32 and an internally threaded link 33 constitutes a turnbuckle whereby the dimensions between the end of bracket 30 and the operating lever 31 may be adjusted for the comfort of the amputee. The attachment of the piece 33 to the bracket 30 and the threaded piece 32 to the lever 31 is loose and constitutes a lost motion linkage whereby the small longitudinal movement of the stump bucket 21 may be accommodated without strain on the apparatus. The turnbuckle and lost motion features of this drag link are necessary for the comfort of the amputee for two reasons, first to allow a slight movement of the stump bucket without operating the device and second to adjust the stump bucket to a "normal" position without any conscious effort to prevent either pronation or supination of the hand.

The flexible shafts 12 and 13 shown in Fig. 3 extend into a gear box 34 where they operate by means not shown in detail the wrist flexion mechanism including a worm and gear and ending in a pinion 35 cooperatively associated with a gear sector 36 and the finger mechanism shown in some detail in Figs. 25 and 26. The device 37, shown in Fig. 3, is a cam arrangement for limiting the wrist flexion movements about the axis 38.

Figure 5:
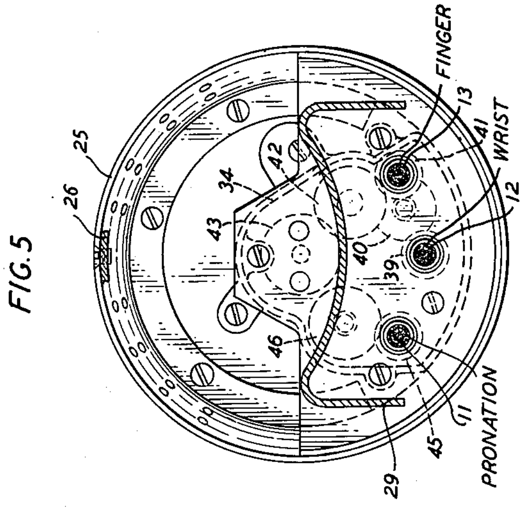
Fig. 5 is a view of the forearm section partly in section on the line 5—5 of Fig. 4 showing particularly the location of the three flexible shafts leading from the transmission device to the gear box of Fig. 6.
Figure 6:
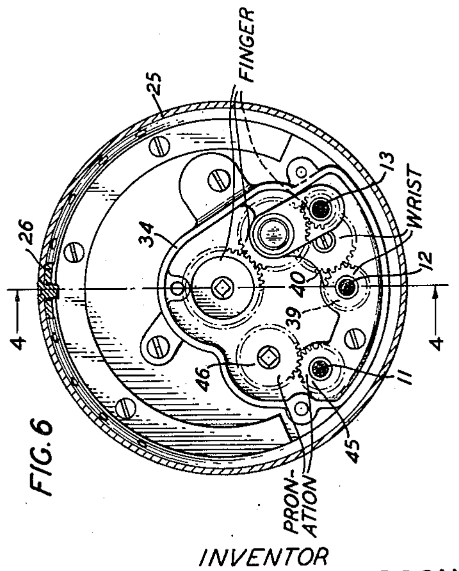
Fig. 6 is a view partly in section taken on the line 6—6 of Fig. 4 showing particularly the location of the gears connecting the input flexible shafts from the transmission device and the output shafts leading to the artificial hand.

Looking at Figs. 5 and 6, it will be noted that the wrist shaft 12, squared at each end, operates a pinion 39 meshing with a gear 40, attached by a shaft (not shown) to operate the worm and gear and thence the pinion 35 to effect the wrist flexion movement. The finger flexible shaft 13 operates a pinion 41, an idler gear 42, and an operating gear 43, which in turn imparts motion to the flexible shaft 44 leading to the finger joint actuator shown in detail in Figs. 25 and 26. The shaft 11 operates a pinion 45 and a gear 46 leading to the mechanism for effecting pronation and supination of the hand, not shown here since similarly operating means is disclosed in the aforesaid Alderson patent.

The operating levers for the transmission unit are best shown in Figs. 8, 9 and 10. The link 31, movable upwardly or downwardly as shown in Fig. 9, is held securely in place by a link 47 pivoted to its lower end and a link 48 pivoted to its upper end. An arm 49 attached to the link 47 therefore will move either the lever 50 upwardly or the lever 51 downwardly as the drag link piece 32, as shown in Fig. 9, is moved upwardly or downwardly respectively. The lever 48 is pivoted at 52 and by a pivot pin 53 in an elongated recess in the lever 42 operates a short arm 54 pivoted at 55. Either an upward or a downward motion of the pivot pin 53 will rotate the arm 54 and bear against one of the ears of the plate 56. This plate 56 is secured to an arm 57 pivoted at 58 to cause the bearing face 59 to move the disc bearing plate 60 in turn to operate the multiple disc clutch 61 and thus move the pronation flexible shaft 11. Thus either a movement of pronation or a movement of supination of the stump bucket will operate the multiple disc clutch 61.

On a movement of pronation the piece 32 of the drag link is pulled downwardly and the lever 51 is moved. This lever is pivoted at 62 and thereafter lifts the cap 63 normally depressing the button 64 of a micro-switch 65. With the button 64 normally depressed the micro-switch 65 maintains an open circuit (as indicated in Fig. 19) so that as the lever 51 is moved and cap 63 is lifted this switch operates and closes one of the three circuits for causing the motor 6 to operate.

On a movement of supination the piece 32 of the drag link is pushed upwardly and the lever 50 is moved. This lever is pivoted at 66 and it too lifts the cap 63 through the pin 67 and adjusting nut 68 whereby the micro-switch 65 is operated. In addition, the lever 50 also depresses an arm 69 of the reverse switch lever 70 so that a cap 71 is lifted from the button 72 of one of the two reverse switches 73. Thus the switch 65 is operated by both lever 50 and 51 but the reverse switch 73 is operated only by the lever 50.

It may be noted that lever 51 is held in a normal position by spring 74, lever 50 is held in a normal position by spring 75 and lever 70 is held in a normal position by spring 76. It may further be noted that cap 63 may be attached to the lever 51 so that as the lever 51 is rotated in a counterclockwise direction this cap is lifted from the button 64. At this time the shaft 67 moves upwardly through a comparatively large aperture in the lever 50. When the lever 50 is rotated in a clockwise direction the shaft 67 is lifted by the nut 68 and consequently the upward movement of the cap 63 also causes the lever 51 to move. Also to be noted are the adjusting screws and nuts at each end of the various operating levers. Thus for fine adjustment of the lever 50, by way of example, the screw 77 is turned until the desired adjustment is secured whereupon it is locked in place by the nut 78. The adjustment of the other levers will be apparent and consequently will not be described in detail.

It has been set forth hereinbefore that the wrist flexion movement may be carried out by a forward hunching of the shoulders whereby relative movement between the cable 18 and the sheath 19 may be effected. Looking at Fig. 8 it will be seen that tension on the cable 18 will cause the lever 20 to rotate in a clockwise direction. Thereupon the arm 79 will relieve the normal pressure on the button 80 of the micro-switch 81 and this switch will operate to close the motor circuit. Another lever 82 has one arm cooperating with the arm 20 and another with the arm 83 so that when the cable 18 is sufficiently tensed the reverse switch lever arm 70 will be rotated in a counterclockwise direction to operate the reversing switches including the switch 73.

The lever 20 is pivoted at 84 and has a bearing screw 85 adjusted in cooperative relationship with a shaft 86 leading to the multi-disc clutch 87 for imparting movement to the wrist flexion shaft 12. Thus as the cable 18 is tensed, the switch 81 will be operated and the multi-disc clutch will be enabled. If the cable 18 is further tensed, the reversing switch will also be operated.

For operating the finger and thumb mechanism a window is cut in the forearm section 2 and a plate 85 is hinged thereto. A felt faced stop 86 is adjusted against the surface of the amputee's muscle so that the plate 85 will ride as a whole on such muscle. A bracket 87 is mounted on this plate to which a lever 88 is pivoted. A short arm of this lever is used to tense a cable 89 and a long arm carries a plate 90 normally somewhat sunk into the amputee's muscle. When the amputee flexes this muscle its contour tends to straighten out, the lever arm 88 is rotated in a clockwise direction, and the cable 89 is tensed. The other end of this cable, as shown in Fig. 10, is attached to a lever arm 91 below its pivot point 92 so that when it is tensed the clutch shaft 93 will be pressed in and if the movement is sufficient the reverse switch lever arm 83 will be engaged and operated. This lever 91 will also, on the beginning of its movement, operate a switch 94 (shown in Fig. 19). The spring 95 (Fig. 17) is used to exert a normal pressure on the plate 90 and being attached to a short arm of the lever arm 88 provides a substantially uniform pressure on this plate 90.

Figure 1:
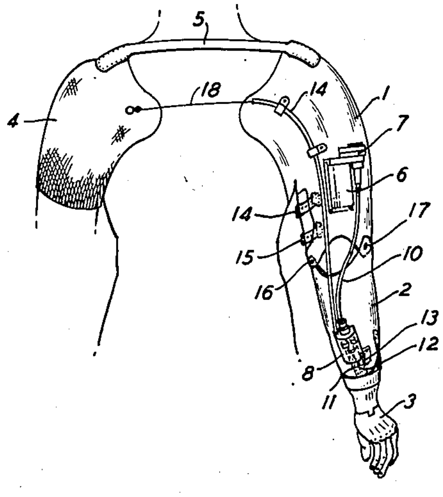
Figure 2:
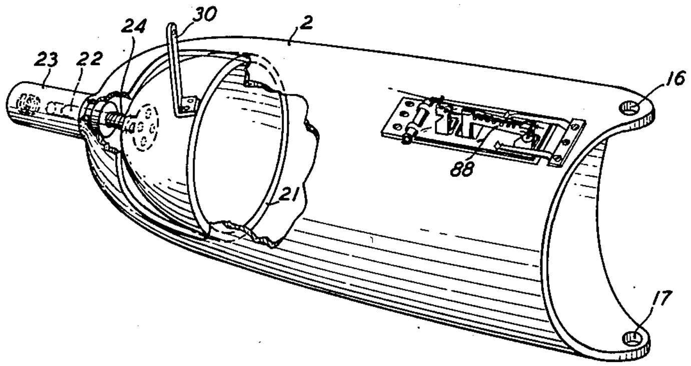
Fig. 2 is a perspective view of the forearm section of the prosthetic device having a portion broken away to show the stump bucket movable by the amputee by a natural movement of pronation or supination in relation to the forearm section whereby pronation or supination of the hand may be effected.

The motor and gearbox shown in Figs. 20 to 24 inclusive are mounted as indicated in Fig. 1 on the upper arm section of the harness. The motor 6 is generally rectangular in shape, but the gearbox 7 for transmitting power from the motor to the flexible shaft 9 at a reduced speed has been put into a generally convexo-concave shape shown particularly in Figs. 21, 23 and 24. The two devices are mounted on a plate 100 which may be easily bent to conform to the contour of a particular amputee's arm. This plate 100, which may be riveted to the upper arm harness 1, has a pair of ears 101 and 102 for attachment to the motor and gearbox unit. The gearbox 7 is provided with four ears such as 103, each having an elongated screw hole cut therein so that the relation of the gearbox to the motor 6 may be changed, as clearly indicated in Fig. 22. Thus, in Fig. 23, the motor has been rotated in a clockwise direction as far as possible before the screws for attaching the gearbox thereto have been tightened, thus giving the plate 100 a long radius curvature. In Fig. 24, the adjustment for a short radius curvature is illustrated. Thus the motor and gearbox unit have been streamlined to become as inconspicuous as possible under the coat sleeve of the amputee.

In operation, when any one of the switches, 65, 81 or 94, has been operated the motor will start into operation and its movement will be communicated by the flexible shaft 9 to the transmission unit 8. Here it will be noted (Fig. 11) that the squared end of the shaft 9 is inserted in an appropriately squared recess of the shaft 103 so that this shaft continually rotates as the motor operates. The shaft 103 is splined to the sleeve 104 to which a gear 105 is affixed whereby the gear 105 continually rotates during the operation of the motor. The gear 105 meshes with a gear 106, splined to shaft 86, and gear 106 in turn meshes with gear 107, splined to shaft 108 so that the operation of the motor and the rotation of the shaft 9 results in the rotation of the three gears 105, 106 and 107 and the three shafts 103, 86 and 108.

Each shaft is arranged to operate a disc compression plate for a multi-disc clutch, such as the plate 60 for the clutch 61. Such a clutch consists of a plurality of steel discs 109 loosely splined on the input shaft 103 cooperating with alternately placed abrasive discs 110 internally splined to the cup 61 fixed to the output shaft 111. When the ear 56 is moved to the right as hereinbefore explained, the bearing plate 59 will be moved toward the left and consequently the shaft 103 and the compression plate 60 will be moved toward the left. Accordingly the discs 109 and 110 will be brought into more intimate contact with each other so that the motion of the shaft 103 will be communicated to the shaft 111. Since the squared end of the shaft 11 is inserted in the square recessed shaft 111, the motion of the shaft 9 will be communicated to the shaft 11. Fig. 12 indicates that the shaft 12 has its squared end inserted in an appropriately square recess in the shaft 112 whereby when the cable 18 is tensed the shaft 86 will be moved to the left, the multi-disc clutch 87 will be enabled and the shafts 112 and 12 will be rotated.

Means, consisting of a spring 113 within the shaft 86, is provided to hold the clutch 87 normally opened and inoperative. The spring 113 is preloaded, that is, it is constructed and arranged to require a predetermined effort to be applied to the tensing of the cable 18 for the purpose of providing a sensory response to the muscular control effort as will be explained in more detail hereinafter.

Since the spring 113 is buried within the shaft 86 the accurate adjustment thereof must be made prior to the assembly of the transmission unit. An alternative arrangement whereby a certain amount of adjustment may be made after assembly is shown in Fig. 15. Here the shaft 114 contains a spring 115 which normally holds the clutch open. However, the compression plate 117 is not directly moved by the shaft 114 but is under the control of a spring 116 so that the clutch cannot be closed so tightly that the motor will stall. The spring 116 may be adjusted so that even though the shaft 118 (corresponding to any one of the shafts 11, 12 and 13) becomes completely stalled as by the reaching of the complete end of the grasp between the thumb and finger mechanism, the clutch 119 will still slip before the motor may be stalled. This provision will be explained more in detail in connection with Fig. 18.

Another alternative arrangement of a completely adjustable preloaded spring is shown in Fig. 16. Here the adjusting screw 120, for adjusting the relationship between the lever 20 and the shaft 86, is made in the shape of a threaded capsule containing a spring 121 forcing the pin 122 into contact with the bearing face of the shaft 86. The loading of this spring 121 may be adjusted by the cap 123 so that the amputee may execute a small movement of the cable 18 before the clutch on the shaft 86 will be enabled. This again will be more fully explained hereinafter.

Figures 25 and 26 show in some detail a finger and thumb mechanism as an illustration of a joint actuator operated by a flexible shaft. This mechanism is encased in a plastic shell indicated in broken line outlines in Fig. 25 taking on the appearance of a hand and which when gloved is extraordinarily realistic. The mechanism consists essentially of a frame member 125 which may be pivoted as hereinbefore explained to a shaft 38 inserted in the bearing 126 so that by the gear 35 and the cooperating gear sector 36 the whole mechanism may be turned as in wrist flexion. The frame may be described as essentially a Y shaped piece, the wrist portion being the base of the Y, and the finger portion 127 and the thumb portion 128 being the branches of the Y. A thumb element 129 is pivoted at 130 to the end of the thumb branch 128 of the frame. One end of this thumb element extends out into the shell of the cosmetic thumb 131 to cause the rotation of the thumb about the axis of the pivot 130. To the opposite end of the thumb element 129, a dog 132 is pivoted at 133. The dog 132 is constructed and arranged to cooperate with a rack 134 affixed to the frame member 127. It is obvious that when the thumb 131 encounters an obstruction, the thumb element 129 will tend to be rotated in a counterclockwise (Fig. 25) direction and that the dog 132 will engage one of the teeth of the rack 134.

The dog 132 is provided with a stop 135 bearing against the thumb element 129 so that when the dog is in engagement with the rack 134 it cannot slip past any of the teeth thereof.

The finger element is a lever 136, pivoted at 137 and having a bifurcated end providing the two terminations 138 and 139 to be inserted in the shells 140 and 141 of the index and second fingers respectively. The opposite end of the finger lever 136 has firmly affixed thereto a sickle shaped cam 142 and a sector of a gear 143, which meshes with a spur gear 144 fixed to a shaft 145. The shaft 145 is journalled in the frame and has affixed to the other end thereof a gear 146 meshing with a worm 147 firmly attached to the shaft 44. In Fig. 26 the worm 147 and gear 146 are shown as being mounted in a box formed in the frame and from which a cover has been removed for affording this view. The worm and gear may thus be lubricated in the conventional manner. A roller 148 is mounted on the dog 132, near the outer end thereof, and this normally rides on the surface of the cam 42, by virtue of the spring 149, affixed to the dog midway of the pivot 133 and the roller 148.

The manner in which the device is operated may be seen from a number of figures including Fig. 17, Fig. 11 and Figs. 25 and 26. The amputee flexes the muscles provided for moving the fingers naturally whereupon the contour of these muscles straightens out and the plate 90 is pushed upwardly so that the lever 88 is rotated in a clockwise direction. Thereupon the cable 89 is tensed and the lever 91 of the transmission unit is moved. This will first operate the finger switch 94 (not shown in Fig. 11) and then exert pressure on the shaft 108 for enabling the corresponding multi-disc clutch and imparting motion to the shaft 13 and eventually through the gears in the wrist adapter (Fig. 6) to the finger shaft 44. If the amputee's effort is intense the lever arm 91 will cause the movement of the reverse lever arm 83 to operate the reversing switch 73 to cause the motor to run in the reverse direction. In the forward rotation of the shaft 44 the finger element 136 will be rotated in a counterclockwise direction (Fig. 25) and the thumb element in free movement will move equally as fast by virtue of the roller 148 bearing on the cam 142. When an obstruction is encountered the dog 132 is forced into engagement with the rack 134 and the roller 148 leaves contact with the cam 142. Thus the thumb stops its movement but the finger continues. In effect then, the finger and thumb in free movement approach each other swiftly until a grasp has been effected and thereafter at half the rate until the grasp becomes too firm for further movement. On a reverse movement of the shaft 44 the grasp is relaxed, the dog 132 thereupon leaves its engagement with the rack 134, and the roller 148 again engages the cam 142. Thereafter the grasp opens at double the rate of movement of the finger element 136.

Applicant having given a complete description of the mechanical elements employed will now set forth the various features of his invention in a description of the manner of the operation thereof and the purposes for which certain of these elements have been provided.

*The general combination*

A feature of the invention is the general combination of a source of electrical power, a motor operable thereby, joint actuators, separate clutches for each joint actuator and flexible shafts between the motor and said clutches and between each said clutch and each said joint actuator. In a preferred embodiment of the invention disclosed herein by way of example, power is provided by an electrical motor actuated by a storage battery carried by the amputee. Experience has shown that a storage battery of such small size that it can be made inconspicuous and of such small weight that carrying it is not burdensome, is capable of operating a small lightweight electrical motor sufficiently powerful to operate the joints of an artificial arm through all the movements of a normal day's activities. In the example herein disclosed an arm for an amputee retaining a major portion of his forearm is provided. There is a harness for the upper arm and a stiff plastic case for the forearm. A motor and a reduction gearing are mounted on the said upper arm housing and a transmission device is mounted on the forearm case. A flexible shaft transmits power to the transmission device and this device in turn transmits power by separate flexible shafts to several actuators. The transmission consists of a plurality of clutches each for cooperatively associating the flexible shaft from the motor to one of the flexible shafts leading to the actuators. Each actuator consists of a worm gear drive for one of the parts to be moved, such as the wrist pronation joint, and the worm and gear are so designed that the part moved will be substantially locked in such position against movement under pressure exerted by outside forces. Under some body movement executed by the amputee, the motor may be started either in one or another direction of rotation and a selected clutch thrown in so that a selected arm movement will be executed. This movement will be sufficiently powerful to meet any normal requirement whereas the exertion by the amputee will be slight and well within his capabilities. When the amputee relaxes, the clutch will be released and the motor will cease rotation. The use of flexible shafts in this class of devices is particularly valuable as it allows free movement of the arm, is practically noiseless and transmits power with little loss. The use of flexible shafts is an improvement both from an operational and economic standpoint over the complicated mechanical arrangement shown in my Patent 2,580,987. The simplicity of the flexible shaft 9 from the motor 6 and gear box 7 attached to the upper arm harness 1 to the transmission device 8 mounted on the forearm casing is at once apparent.

The use of flexible shafts and electrical connections of variable lengths, whereby the device as a whole may be custom fitted to each amputee is a valuable feature of the invention.

*Streamlining*

A feature of the invention is what might be termed a streamlined artificial arm, the various parts being designed with such contours that the arm covered by a coat sleeve will present a normal appearance and the cosmetically fabricated hand will require more than a second glance to bring notice and awareness of its artificiality. In accordance with this feature the reduction gearing unit is attached to the housing of the motor in such a way that its curvature may be adjusted to the curvature of the amputee's upper arm, that is, the curvature may be based on a short radius for a thin arm or on a long radius for a well developed arm. The mounting of the gear reduction unit on the motor housing is adjustable about the axis of the shaft of the motor and the two may be secured in any desired adjusted position. This has been fully disclosed in Figs. 20 to 24 where it has been shown how the motor and gear box unit, mounted as indicated in Fig. 1, may have its general curvature adjusted to suit the particular amputee. This unit is generally provided with a cover (not shown) to prevent snagging of the amputee's coat sleeve.

In the same manner and for the same purposes an offset between the longitudinal axis of the forearm and the longitudinal axis of the artificial forearm is provided whereby the streamlining effect is enhanced without noticeable strangeness in the operation of the arm and hand by the amputee. It has been found that by so offsetting these axes, the transmission unit, streamlined in itself to a natural arm curvature may be mounted just above the wrist section without producing a noticeable bulge under the sleeve of the amputee's coat. Also the linkage between the stump bucket and the transmission may be practically hidden from view. This is clearly indicated in Fig. 3 where the center line of the stiff casing 2 is offset a small amount (exaggerated herein for the purposes of explanation) from the center line of the mechanism of the hand. This offsetting of the center line of the actual forearm produces no strangeness in operation to the amputee.

*Separate or simultaneous operation*

Another feature of the invention is the provision of means for the simultaneous exercise of a plurality of controls whereby the more complicated but natural movements of the arm may be reproduced. Heretofore power driven arms were provided with a selector device whereby but a single movement could be produced at a time so that a complicated movement became a series of separate movements. The present invention is therefore an advance in the art in that two or more movements can be executed simultaneously so that the disability becomes less pronounced.

Thus with a cosmetically natural appearance of the hand, the streamlining of the mechanism to give the clothed arm a natural appearance, the control by natural movements and the use of simultaneous movements to produce the illusion of naturalness, the amputee will avoid the unthinking but nevertheless disturbing stares of his less handicapped fellow man.

The main power drive is provided by the flexible shaft 9 which rotates a plurality of gears 105, 106 and 107. The three corresponding multi-disc clutches may be operated either separately or simultaneously whereby the three joint actuator shafts 11, 12 and 13 may be operated separately or simultaneously.

*Natural movements*

Another feature of the invention is a control system whereby the amputee may by natural movements produce corresponding movements of the artificial arm. Prior art power driven limbs have been controlled in various ways—such, for instance, as by pressure of the toes against pneumatic bladders or electrical push button contacts and while amputees have become adept in the use of such controls it will be recognized that the control was purely artificial. The present feature is therefore an advance in the art as it gives back to the amputee a measure of natural control which lends comfort and ease to the wearing and use of an artificial limb and restores a great measure of confidence to the unhappily handicapped individual. The most outstanding example of this natural control is exhibited by this movable stump bucket, which in a right hand artificial arm will, by a counterclockwise movement (looking down the amputee's forearm) produce a movement of pronation and by a clockwise movement will produce a movement of supination. It has also been found that sufficient movement of some of the muscles of the upper part of the forearm can be produced by an amputee for control purposes. Thus a flexing of the flexor carpi radialis and the flexor carpi ulnaris may be used to flex the wrist and since this is a purely natural movement a control of this nature will add to the sensory comfort of the amputee. Likewise a flexing of the flexor digitorum sublimis which flexes the middle phalanges and the flexor digitorum profundus which flexes the distal phalanges might be used for control of the finger actuators. However, these muscles are so closely grouped in the forearm that not all amputees are able to flex them differentially and so the use of these muscles as a group may be employed as a finger control and the wrist control is transferred to another portion of the body. Since these muscles do not bunch as spectacularly as the biceps the control is achieved by sinking the control plate 90 (comfortably) into the muscles and then taking off the movement thereof through the powerful straightening of the muscles when flexed. Experience has shown that such a control is reliable and easily and comfortably executed by an amputee.

In the specific embodiment of the invention herein disclosed, the wrist pronation and supination is accomplished by a natural rotary movement of the stump, the finger movement is accomplished by a natural flexing of the forearm muscles, and the wrist dorsal and volar flexion movements are accomplished by a shoulder shrug.

Another feature of the invention and one which aids the sense of naturalness is the use of a multiple disc clutch. The constantly moving or power input element is in the form of a splined shaft having a plurality of thin steel discs loosely threaded thereon. The power output element is in the form of an internally splined cup having a plurality of friction discs loosely mounted therein and alternately interspersed with the said steel discs of the power input element. A third element consists of a compressor disc used to compress the mass of discs so that power may be transmitted from the power input element to the power output element. Such a clutch provides a silent and efficient power transmission device, and a slip device whereby injury to the apparatus through unduly prolonged application of power may be avoided.

This feature of the invention is what may be termed a direct force control. By the use of this multiple disc clutch as a power transmission element the grasp between the thumb and the fingers may be made light or heavy as the amputee desires. The finger control, as an example, consists of a linkage controlled by the flexing of the muscles of the forearm. This linkage first actuates an electric switch to turn on the motor and then moves the clutch actuator. A slight effort by the amputee will operate the clutch lightly so that against no resistance the fingers and the thumb will move together rapidly but when some object is grasped the clutch will slip. However, by an increased effort the clutch may be tightened and the grasp thus increased. Since the effort is thus made against an increasingly greater resistance the tightness of the grasp is thus made somewhat proportional to the effort on the part of the amputee and the control thus becomes quite natural.

*Reverse Movements*

The movement of pronation accomplished by the clockwise rotation of the stump bucket 21, producing an actual reverse movement of the motor which is translated into a forward movement of the gears 45 and 46 and the movement of supination accomplished by the counterclockwise rotation of the stump bucket 21 are entirely natural movements. In the operation of the other joint actuators, and as has been pointed out hereinbefore the muscles for producing the forward and backward movements are so closely bunched that the differential flexion thereof by the amputee is not possible.

Therefore a novel means for and method of operation has been embodied in the present device. In a word the method is to flex a given muscle lightly for a forward movement and intensely for a reverse movement. In the finger control herein disclosed the thumb and fingers may be brought together by a slight flexing of the muscles of the forearm, a tight grasp may be procured by a somewhat greater flexing of these muscles and a reverse action or the relaxing of the grasp may be had by a still greater flexing of the muscles. It has been found that amputees are very sensitive to the degree of effort needed to produce these effects and can manipulate the controls with the greatest precision. Such controls are therefore constructed and arranged to pass through a series of operational stages in a smooth and continuous movement and with a degree of sensory response to which the amputee soon becomes accustomed and which he is able to manipulate with the greatest of facility. Assuming a fixed muscular effort, that is a controlled and slowly built up effort, the motor enabling switch is first operated followed thereafter by the engagement of the clutch and the continuingly increasing pressure applied thereto to render it increasingly effective. Then a point is reached, considerably short of stalling the motor where further compression of the discs of the clutch is impossible. At this point a preloaded spring comes into play so that further control pressure is dissipated in this spring until a sensory barrier is reached. This provides a signal to the amputee that the reversal of the motor is iminent and a continuing of the control effort will produce such reversal. This sensory barrier is provided by another preloaded spring associated with the reversal switch so that it is necessary to move against this barrier only a short distance before the switch will be operated. The whole control movement is smooth and continuous through these various stages and the amputee soon becomes sensitive to the degree of pressure necessary to produce a light grasp, or a heavier grasp, or finally a relaxation of the grasp.

In Fig. 18 two graphs are shown, one marked "control effort" and the other marked "torque transmitted". The first graphically depicts the resistance which has to be overcome by the amputee and represents an effort of which he is aware. A short space after this effort is started the amputee feels the operation of the motor enabling switch, later he feels the giving of the overload spring and finally he feels the encounter of the sensory barrier which tells him that the reversing switch is about to be operated.

The lower of the two graphs, that one marked "torque transmitted," depicts the practical result in the amount of power that is fed into the output shaft, which it will be noted always falls short of the amount which would cause the motor to stall. Thus, some little distance in the range of the control movement, after the enabling switch has operated to its on position the multiple disc clutch will be sufficiently operated to start movement of the output shaft. Thereafter the torque increases proportionately until the overload spring is encountered and after this the torque still increases but at a much lower rate. Hence it will be seen that the system of springs and levers will produce a certain sensory effect while producing a desired mechanical result, which effect will be characterized by ease to the amputee and will provide a definite set of signals which he soon learns to recognize.

The preloaded spring encountered when the clutch is completely operated is shown in some detail in Fig. 16. This is an arrangement placed in the line of control so that when a clutch has been engaged to a maximum degree required in an operation, but not far enough to stall the motor, then further movement of the control, as by the clockwise movement of the lever 20 will result in the giving way of the spring 121. Under the normal operation the button 122 pushes against the end of the clutch input shaft 86 but when the pressure has been built up to a given point, determined by the adjustment of the cap 123, then the spring 121 gives way and further rotation of the control arm 20 will merely result in the compression of this spring.

Another variation of the preloaded spring is shown in Fig. 15 where the splined shaft 114, corresponding to either of the shafts 86 and 108, may be moved toward the left. About the shaft 114, there is fitted a spring 116 so that as the shaft is moved toward the left its movement will be transmitted through the spring 116 to the disc bearing plate 117. However, when the pressure has been built up to a given point, the preloaded spring 116 will give way, as before, so that further movement of the shaft is not exercised in such great pressure against the disc plates that the motor will stall.

Still another feature of the invention is the means for riding over the forward motion controls by a quick movement of the muscles to achieve a reverse movement of the motor. As pointed out above, if an amputee should flex the muscles of his forearm slowly he would start the motor, throw in the clutch, gradually tighten the clutch, encounter a barrier which tells him that he has reached the end of that control and thereafter and finally reverses the motor. If he wants to start the motor in a reverse direction (let us say to release a grip he has on some object) he makes a very quick movement in the flexing of the muscles so that long before it can come up to speed, its reversing circuit will be operated. If, by way of example, he is grasping some fragile object which would surely be fractured by the heavier grasp of which the device is capable, then he uses a ballistic movement of his muscles rather than a fixed movement with the practical result that he can start the motor in reverse rather than bring it up to speed in the forward direction which, through the increasingly effective operation of the clutch, would cause a tightening of the grasp.

A feature of the invention may therefore be stated as a means for passing through a forward movement control stage to a reverse movement control stage without operating the forward movement means.

Again, it has been found that in the execution of a ballistic movement a substantial part of the total time is taken in the muscular preparation for starting before any motion is made and that the motion thereafter is very swift. Consequently, when a ballistic motion is made to start the motor in the reverse direction the reversing switch can be reached and operated before the armature field of the motor can be built up sufficiently to start the rotation in the forward direction.

A feature of the invention may therefore be stated as the provision of means relying on a natural law of physiology for starting a motor in one direction of rotation by swiftly passing through a series of operations including the closure of circuits for starting the motor in the opposite direction.

On release from a reverse rotation of the motor, the reversing switch is first released and shortly thereafter the enabling switch is released but, due to the lengthening of the operating differential in the reversing switch, this interval is short and is passed over quickly. Therefore, the so-called plugging of the motor is of such short duration that there is insufficient time for the direction of the armature field to reverse effectively and no movement in the forward direction will take place, but only a diminution of the coasting thereof.

*Dominating motion*

Another feature of the invention is the domination of the reverse direction motion of the motor. It has been pointed out hereinbefore that each of the controls is capable of producing both forward and reverse direction of movement. However, where two movements, as pronation and wrist flexion are simultaneously signalled both will be in a forward direction unless one of them has been extended to cause a reverse movement, whereupon both will be executed in a reverse direction. It is, of course, evident that the single motor used in common for all the movements cannot rotate in both directions at once and hence the circuit arrangement is such that the reverse direction becomes controlling. In other words, the circuit arrangement is such that a simultaneous attempt to run the motors in two directions cannot be made. Hence no circuit interference can be set up.

This is clearly shown in the circuit diagram, Fig. 19. Here it will be noted that any one of the joint actuator switches 65, 81 or 94 will enable the motor 6. However, the direction in which it operates is determined by the reversing switches including switch 73. If any one of the controls has been operated far enough to move the reversing switch, then no other control, however lightly it is operated, can cause the motor to run forwardly.

*Operating differential of switches*

Another feature of the invention having direct relation to the modular control means, hereinafter fully explained, is a construction and arrangement whereby the switch devices employed may be operated in such a way that the module or fundamental measure of time over which an amputee may operate any given joint by a ballistic movement is controlled by the mismatch between perfect theoretical adjustment of the switches and the practical control thereof. So-called microswitches are employed for circuit control so that, in the movement of the button thereof, there is a practical difference in the position of a button actuator between the on and off movement of the switch. Where in the forward movement of a button actuator the switch operates at a given position, in the reverse direction the button actuator passes back and beyond that position before the switch releases. This difference between the operation and release of a switch may be exaggerated, as shown in Fig. 18, or changed by operating the switch by a lever arm with the switch operating point at a different distance from the fulcrum than the controlling point. Thus, if the switch operating point is nearer the fulcrum than the controlling point the movement of the latter will be greater while if the switch operating point is further along the lever the movement of the controlling point is less.

Advantage is taken of these considerations where two micro-switches are operated by a single lever arm by placing the two switches at different distances from the fulcrum, thus in effect giving one a much greater latitude than the other. Where one switch is used to enable the motor and the other is used to reverse the direction, the second may be placed nearer the fulcrum of the actuating or control lever and the first further away. Therefore in the actual movement of the lever there will be a small difference in travel of the lever between the on and the off positions of the enabling switch, whereas there will be a comparatively great travel thereof between the on and off positions of the reversing switch. In one embodiment of the invention a ratio of about 7½ to 1 is used. By this arrangement the on position of the reversing switch may be placed a safe distance beyond the point where the encounter of the preloaded spring is sensed after which the effort may be considerably relaxed without releasing the reversing switch. Thus means is provided to reach the reverse movement zone by riding through the forward movement zone very quickly and thereafter to maintain the reverse movement without maintaining the maximum effort.

This may clearly be seen from Fig. 8. When the wrist control cable 18 is tensed then the first movement of the arm 20 and its extension 79 is to operate the enabling switch 81. The reversing switch 73 however depends on the engagement of the lever 82 at a very much shorter distance to the pivotal axis 84. Thus the enabling switch operates, in the movement of the lever 20, considerably before the reversing switch. A similar provision is made with respect to the finger control. In this case, though not so clearly apparent in Fig. 13, the enabling switch 94 is operated first and thereafter the reversing switch 73 is operated.

Another feature of the invention is a construction and arrangement to avoid the effects of coasting of the motor at the end of a movement. This consists essentially of a means to disconnect the power drive before the circuit for the motor is opened, in other words to reverse the sequence of the steps taken in starting an arm movement. Normally when an arm movement is to be executed, the motor is started in operation before the clutch is thrown in but this series is changed at the end of the movement so that the clutch is first thrown out and thereafter the circuit of the motor is opened so that any coasting of the motor through inertia of the moving parts is not transmitted to the part of the arm being moved.

*Muscular control device*

A feature of the invention is a compensating means for over-riding involuntary muscle flexion. Heretofore, notably in Patent 2,580,987, muscular control devices have been disclosed, consisting essentially of a plate or pad bearing against a muscle which is to be flexed when the control is to be operated. In accordance with the present invention however, greater accuracy is secured by mounting the responsive plate or pad on a greater plate or pad which rides on a larger surface so that the control may surely be operated by a voluntary flexion of the muscle rather than by some accidental or involuntary movement thereof.

This feature of the invention is a control device selectively responsive to a conscious flexing of a body muscle and unresponsive to a natural bulging thereof. Where, by way of example, the flexing of the muscles of the forearm is employed to activate the finger movement, some sort of compensation must be made for the natural or accidental bulging of these muscles when the arm is bent or otherwise moved to different positions. The control device is therefore constructed and arranged so that the device as a whole rides over a large area including the muscle in question while the active force is taken from a small area. The control device is pivoted on the stiff forearm casing in such a manner that the control device as a whole is held by a spring at a fixed distance from the surface of the arm regardless of how the distance between the forearm casing and the arm changes through the natural movements of the arm. Thus the control may not be accidentally operated and is therefore responsive only to a conscious flexing of the muscles. As hereinbefore stated, the particular muscles employed may not bunch into a tight ball as the biceps and hence the control plate must be pressed or sunk into the muscle so as to be moved as the middle part of a catenary is raised when such a strand is put under greater tensile stress. This feature may therefore be stated as a means selectively responsive to a voluntary flexing of a given body muscle and unresponsive to a voluntary bunching thereof consisting of the combination of a stiff housing covering the general area of the said given muscle, the said housing having a window formed therein directly over the area of the said muscle, a control device pivoted on said housing having a spring to hold it in close contact with and to follow the general movement of the body area to and from the said housing and a control bearing plate in contact with a small central part of the said muscular area responsive to a voluntary flexing of the said muscle whereby a change in contour thereof may be translated into a movement of said control bearing plate relative to said pivoted control device.

*The stump bucket*

Within the plastic forearm case there is mounted a rotatable stump bucket into which the amputee inserts the stump of his forearm and which he may rotate at will. Attached to this stump bucket, there is a linkage to the transmission unit so that a movement of supination, that is a clockwise rotation looking down the forearm, will first start the motor revolving in the proper direction and then throw in the clutch to the pronation-supination actuator, while a movement of pronation will first start the motor in the other direction and then throw in the clutch to this same pronation-supination actuator. Thus a natural and practically effortless movement on the part of the amputee will produce exactly the same movement of the artificial hand that would have been produced under normal conditions.

Another feature of the invention is a movable mounting for the stump bucket whereby it may move longitudinally to accommodate any longitudinal movement of the stump as the amputee folds his forearm upwardly toward his upper arm. The mounting is provided with a spring so that the stump bucket will follow any apparent shortening of the stump during such movement.

*Modular control*

Another feature of the invention is a means responsive to a ballistic motion of flexion by the amputee to produce a module of motion of one or another of the joint actuators. Fixed motions are differentiated from ballistic motions and for purposes of clear definition are described as follows. A fixed motion is one which is relatively slow and in which two opposing muscles or sets of muscles are in play, the one propelling and the other retarding whereby a fine balance in movement is obtained. A ballistic motion is in the form of a burst of speed with no brake being put on the action. It has been hereinbefore stated that from a physiological and a psychological standpoint a ballistic motion over a given distance and against a fixed load may be reproduced with remarkable fidelity and without conscious effort and may thus be used to produce a faster and therefore smaller module of motion of any one of the joint actuators.

Through modular control the amputee gains a degree of sensory response so that in the operation of his power driven arm he is not compelled to rely exclusively on what may be termed visual feedback. The linkages including the means for operating the electrical circuit switches are constructed and arranged so that by a ballistic or single quick effort and relaxation a module or standard measure of motion may be executed. It has been found that psychologically such a quick effort and relaxation if executed over a fixed distance and against a given resistance will be of an extraordinarily uniform duration and so advantage is taken of this in the design of the apparatus to provide the amputee with means to make certain movements without riveting his attention on the perforance of the apparatus. It has been found, by way of example, that a quick flip of the stump of the arm will activate the wrist pronation or supination actuator to produce about a ten degree rotation and since this can be multiplied at will by a series of such movements the amputee soon becomes adept at pronating his hand while he has his attention focused on some other matter. In other words, through this modular control he achieves a still nearer approach to naturalness.

A module of motion is sought to be made not greater than the allowable error in the practical use of the prosthetic device so that hunting can be avoided. Let us say, by way of example, that an amputee wishes to grasp a pencil held vertically. A tolerable error in the alignment of the fingers and thumb would be ten degrees either side of the vertical for as the grasp is executed the pencil will be adjusted easily to the alignment of the fingers and thumb if they are within this limit. However, if they are not within this limit, the amputee will have to execute a control movement of pronation or supination, but if the module of motion were, let us say twenty-five degrees, then the alignment might be carried through and beyond the desired position so that another and reverse movement would have to be executed. This might have to be repeated a number of times before the amputee succeeded in turning his wrist to the proper position to grasp the vertically held pencil. However, if the module, or smallest measure of movement that can be produced, is within the allowable error of practical use, then a single ballistic control motion by the amputee is sufficient to reach the desired position. The knowledge of this capability of the prosthetic device lends aid and comfort to the amputee and promotes the appearance of naturalness in the operation thereof.

Further, by the use of sliding disc clutches he again approaches a degree of natural response. By way of example, the fingers and the thumb may be driven together to a grasping position and thereafter, by an increase in the effort which produced this movement, the grasp may be increased to any desired degree.

Another feature of the invention is a means to promote the comfort and general mental condition of the wearer of the prosthetic device of the present invention. A certain degree of sensory response is incorporated in the control means whereby the amputee will be able to operate the power driven arm with more confidence, accuracy and facility. Through the modular control where by ballistic motions the amputee may execute a module of motion of any one joint with confidence, without depending on visual feedback and without overdriving to the extent that reverse movement is required and through the use of preloaded springs to provide sensory barriers the amputee soon learns to execute with ease the complicated movements which give a simulation of naturalness and render his efforts inconspicuous to his fellow men.

What is claimed is:

1. In a prosthetic device, the combination of a motor, a plurality of joint actuators, a transmission device operatively inserted between said motor and said actuators, a flexible shaft between said motor and said transmission device, a flexible shaft between said transmission device and each of said actuators, a separate clutch in said transmission device for each said actuator and control means for operating said clutches.

2. In a prosthetic device, the combination of a motor, a plurality of joint actuators, a worm and gear drive for each of said actuators, a transmission device operatively inserted between said motor and said actuators, a flexible shaft between said motor and said transmission device, a flexible shaft between said transmission device and the said worm and gear drive for each of said actuators, a separate clutch in said transmission device for each said actuator and control means for operating said clutches.

3. In a prosthetic device, the combination of a motor, a plurality of joint actuators, a transmission device operatively inserted between said motor and said actuators, a flexible shaft between said motor and said transmission device, a flexible shaft between said transmission device and each of said actuators, a separate multiple disc clutch in said transmission device for each said actuator and control means for operating said clutches.

4. In a prosthetic device, the combination of a motor, a plurality of joint actuators, a transmission device operatively inserted between said motor and said actuators, a flexible shaft between said motor and said transmission device, a flexible shaft between said transmission device and each of said actuators, a separate clutch in said transmission device for each of said actuators, each said clutch consisting of a splined input shaft having a plurality of metal discs loosely mounted thereon and an internally splined cylinder fixed to an output shaft and having a plurality of friction discs loosely mounted therein and interspersed between said input metal discs and control means for operating said clutches.

5. In a prosthetic device, the combination of a motor, a plurality of joint actuators, a transmission device operatively inserted between said motor and said actuators, a flexible shaft between said motor and said transmission device, a flexible shaft between said transmission device and each of said actuators, a separate clutch in said transmission device for each of said actuators and control means for separately or simultaneously and combinationally operating said clutches.

6. In a prosthetic device, a motor for operating the various components thereof, a gear reduction train for adapting the speed of said motor to the desired speed of operation of said components, and means for securing said gear reduction train in various positions about the axis of the shaft of said motor to adjust the general curvature of the combination of motor and gear reduction train to the curvature of the user of said prosthetic device.

7. In a prosthetic device, a motor and a gear reduction train having a generally cylindrical convexo-concave shape and means to adjust the concave curvature thereof to the body curvature of the user thereof.

8. In a prosthetic device, a motor and a gear reduction housing mounted on the end thereof, said combination having a generally cylindrical convexo-concave shape, said gear reduction housing having a plurality of screw body holes elongated on the line of the circumference of a circle whereby said housing may be screwed to said motor in a variety of positions rotated about the shaft of said motor to adjust the degree of concavity of the shape of said combination.

9. In a prosthetic device for a below-elbow amputee, a loose fitting forearm casing and a movable stump bucket mounted therein, a motor, a transmission device mounted on said forearm casing and a plurality of joint actuators including a pronation-supination actuator mounted on said forearm casing, a shaft interconnecting said motor and said transmission device for supplying power on demand to said transmission device, an individual shaft interconnecting said transmission device and each of said joint actuators for transmitting power from said motor to said joint actuators, a linkage between said stump bucket and said transmission device responsive to a movement of supination by said stump bucket and means responsive thereto to start said motor in one direction of rotation to operate said pronation-supination actuator to effect a movement of supination and likewise responsive to a movement of pronation of said stump bucket to start said motor in the opposite direction of rotation to operate said pronation-supination actuator to effect a movement of pronation.

10. In a prosthetic device for a below-elbow amputee, a loose fitting forearm casing to be strapped to and supported by the stump of an amputee's forearm and a longitudinally moving and rotatable stump bucket mounted in the forward end thereof, into which an amputee may insert the extremity of the stump of his forearm and which is rotatable thereby with respect to said casing said stump bucket having spring means for holding said stump bucket firmly against an amputee's stump to adjust for apparent foreshortening of the said stump in different positions of the arm, a motor, a transmission device mounted on said forearm casing and a plurality of joint actuators including a pronation-supination actuator mounted on said forearm casing, a shaft interconnecting said motor and said transmission device for supplying power on demand to said transmission device, an individual shaft interconnecting said transmission device and each of said joint actuators for transmitting power from said motor to said joint actuators, a linkage between said stump bucket and said transmission device responsive to a movement of supination by said stump bucket and means responsive thereto to start said motor in one direction of rotation to operate said pronation-supination actuator to effect a movement of supination and likewise responsive to a movement of pronation of said stump bucket to start said motor in the opposite direction of rotation to operate said pronation-supination actuator to effect a movement of pronation.

11. In a prosthetic device for a below-elbow amputee, a loose fitting forearm casing to be strapped to and supported by the stump of an amputee's forearm and a longitudinally moving and rotatable stump bucket mounted in the forward end thereof into which an amputee may insert the extremity of the stump of his forearm and which is rotatable thereby with respect to said casing, said stump bucket having spring means for holding said stump bucket firmly against an amputee's stump to adjust for apparent foreshortening of the said stump in different positions of the arm, a motor, a transmission device mounted on said casing, the longitudinal axis of said stump bucket being offset from the longitudinal axis of the combination of said casing and said transmission device, a shaft interconnecting said motor and said transmission device for supplying power on demand to said transmission device, and a plurality of joint actuators including a pronation-supination actuator, an individual shaft interconnecting said transmission device and each of said joint actuators for transmitting power from said motor to said joint actuators, a linkage between said stump bucket and said transmission device responsive to a movement of supination by said stump bucket and means responsive thereto to start said motor in one direction of rotation to operate said pronation-supination actuator to effect a movement of supination and likewise responsive to a movement of pronation of said stump bucket to start said motor in the opposite direction of rotation to operate said pronation-supination actuator to effect a movement of pronation.

12. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for effectively coupling said flexible shaft between said motor and said transmission device individually to each of said joint actuator flexible shafts, a motor start switch for each of said actuators for connecting said source of current to said motor to operate said motor forwardly and a motor reversal switch common to said actuators for reversing the said connections between said source of current and said motor to operate said motor in a reverse direction, a control device for operating one of said joint actuators having a given range of movement responsive to a voluntary muscular flexion from a slight to an intense effort, a linkage associated with said transmission device responsive to said control device constructed and arranged through said given range of movement to first operate said associated motor start switch, to second lightly activate said associated multiple disc clutch, to third and over a given part of said range increasingly and more tightly activate said multiple disc clutch and to fourth, and approaching the distant end of said range, operate said motor reversal switch.

13. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for effectively coupling said flexible shaft between said motor and said transmission device individually to each of said joint actuator flexible shafts, a motor start switch for each of said actuators for connecting said source of current to said motor to operate said motor forwardly and a motor reversal switch common to said actuators for reversing the said connections between said source of current and said motor to operate said motor in a reverse direction, a control device for operating one of said joint actuators having a given range of movement responsive to a voluntary muscular flexion from a slight to an intense effort, a stiff casing for containing an amputee's stump, said transmission device being mounted on said casing, a window cut in said casing and a hinge device for pivotally mounting said control device over a given muscular area of said amputee's stump through said window, a contact plate for said control device, spring means for holding said contact plate firmly against a portion of said given muscular area whereby relative movement of said contact plate with respect to said pivoted control device may be produced by said voluntary muscular flexions, a linkage associated with said transmission device responsive to said control device constructed and arranged through said given range of movement to first operate said associated motor start switch, to second lightly activate said associated multiple disc clutch, to third and over a given part of said range increasingly and more tightly activate said multiple disc clutch and to fourth, and approaching the distant end of said range, operate said motor reversal switch.

14. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for effectively coupling said flexible shaft between said motor and said transmission device individually into each of said joint actuator flexible shafts, a motor start switch for each of said actuators for connecting said source of current to said motor to operate said motor forwardly and a motor reversal switch common to said actuators for reversing the said connections between said source of current and said motor to operate said motor in a reverse direction, a control device for operating one of said joint actuators having a given range of movement responsive to a voluntary muscular flexion from a slight to an intense effort, said control device being selectively responsive to a voluntary flexing of a given body muscle and unresponsive to an involuntary flexing thereof, consisting of a stiff housing covering the general area of the said given muscle, the said housing having a window formed therein directly over the area of the said muscle, a mounting plate for said control device pivoted on said housing to follow the general movement of the body area to and from the said housing and a control bearing plate in contact with a small central area of the said muscular area responsive to a voluntary flexing of the said muscle to translate a change in contour thereof into a movement of said control bearing plate relative to said control mounting plate, a linkage associated with said transmission device responsive to said control device constructed and arranged through said given range of movement to first operate said associated motor start switch, to second lightly activate said associated multiple disc clutch, to third and over a given part of said range increasingly and more tightly activate said multiple disc clutch and to fourth, and approaching the distant end of said range, operate said motor reversal switch.

15. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for each of said joint actuator flexible shafts, a motor start switch for each of said actuators and a motor reversal switch common to said actuators, a control device for operating one of said joint actuators having a given range of movement responsive to a voluntary muscular flexion from a slight to an intense effort, a linkage associated with said transmission device responsive to said control device constructed and arranged through said given range of movement to first operate said associated motor start switch, to second lightly activate said associated multiple disc clutch, to third and over a given part of said range increasingly and more tightly activate said multiple disc clutch and to fourth, and approaching the distant end of said range, operate said motor reversal switch, said motor start switch associated with said control device and said motor reversal switch common to said control device each being provided with an operating button and each being constructed and arranged to operate on a given pressure on its said button and to release on a lesser pressure on its said button, a lever system operated by said control device for applying pressure to said switch buttons, said reversing switch being nearer to the pivot point of said lever system than a said motor start switch, whereby a reverse movement of said controlled joint actuator may be enabled by a ballistic effort at muscular flexion by an amputee and maintained thereafter over a given range of relaxation of said effort.

16. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for effectively coupling said flexible shaft between said motor and said transmission device individually to each of said joint actuator flexible shafts, a motor start switch for each of said actuators for connecting said source of current to said motor to operate said motor forwardly and a motor reversal switch common to said actuators for reversing the said connections between said source of current and said motor to operate said motor in a reverse direction, a control device cooperatively associated with said clutch and said switches for operating one of said joint actuators having a given range of movement responsive to a voluntary muscular flexion from a slight to an intense effort, said control device being spring loaded to present a predetermined load opposing said effort and arranged for a predetermined travel, whereby the shortest time of complete operation by a ballistic effort is uniformly timed as a module and becomes effortlessly reproduceable by the amputee.

17. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for effectively coupling said flexible shaft between said motor and said transmission device individually to each of said joint actuator flexible shafts, a motor start switch for each of said actuators for connecting said source of current to said motor to operate said motor forwardly and a motor reversal switch common to said actuators for reversing said connections between said source of current and said motor to operate said motor in a reverse direction, and a plurality of control devices cooperatively associated with said clutch and said switches each for operating a motor start switch and an associated clutch, each said device being constructed and arranged to respond to a natural body movement.

18. In a prosthetic device, a source of current, a motor, a transmission device, a plurality of joint actuators including a pronation actuator and a prehension actuator, a flexible shaft between said motor and said transmission device and a flexible shaft between said transmission device and each of said joint actuators, a multiple disc clutch in said transmission device for each of said joint actuator flexible shafts for effectively coupling said flexible shaft between said motor and said transmission device to its said associated joint actuator flexible shaft, a motor start switch for each of said actuators for connecting said source of current to said motor to operate said motor forwardly and a motor reversal switch common to said actuators for reversing said connections between said source of current and said motor to operate said motor in a reverse direction, a control device cooperatively associated with said clutch and said switches responsive to a rotation of an amputee's stump for operating a motor start switch and an associated clutch leading to a pronation actuator and a control device responsive to a flexion of forearm muscles including the flexor digitorum sublimis for operating a motor start switch and an associated clutch leading to a prehension actuator.

19. In a prosthetic device, a source of current, a motor, a transmission device, a plurality of joint actuators, a flexible shaft between said motor and said transmission device and a flexible shaft between said transmission device and each of said joint actuators, a multiple disc clutch in said transmission device for each of said joint actuator flexible shafts for effectively coupling said flexible shaft between said motor and said transmission device to its said associated joint actuator flexible shaft, a motor start switch for each of said actuators for connecting said source of current to said motor to operate said motor forwardly and a motor reversal switch common to said actuators for reversing said connections between said source of current and said motor to operate said motor in a reverse direction, a control device cooperatively associated with said clutch and said switches for operating one of said joint actuators having a given range of movement responsive to a voluntary muscular flexion from a slight to an intense effort, a linkage associated with said transmission device responsive to said control device, and a preloaded spring means encountered in the forward movement of said control means and near the end of the said given range of movement to signal the amputee in his operation of said control device that he has reached a barrier beyond which additional effort will produce a reversal of movement.

20. In a prosthetic device, a source of current, a motor, a transmission device and a plurality of joint actuators, a flexible shaft between said motor and said transmission device and a flexible shaft between said transmission device and each of said joint actuators, a multiple disc clutch for each said joint actuator shaft and a pressure plate for each said clutch for pressing the discs thereof together to transmit power from said motor flexible shaft to said associated joint actuator shaft, and a control means cooperatively associated with said source of current, said motor and said transmission device for concurrently connecting said source of current to said motor and for operating each said pressure plate, said control means terminating in a spring of a strength under that necessary to operate the said associated clutch strongly enough to stall the said motor.

21. In a prosthetic device, a source of current, a motor, a transmission device and a plurality of joint actuators, a flexible shaft between said motor and said transmission and a flexible shaft between said transmission device and each of said joint actuators, a multiple disc clutch for each said joint actuator shaft and a pressure plate for each said clutch for pressing the discs thereof together to transmit power from said motor flexible shaft to said associated joint actuator shaft, and a control means cooperatively associated with said source of current, said motor and said transmission device for concurrently connecting said source of current to said motor and for operating each said pressure plate, said control means terminating in an overload compression spring for operating said associated clutch approaching but short of the stalling point of said motor.

22. In a prosthetic device, a source of current, a motor, a transmission device and a plurality of joint actuators, a flexible shaft between said motor and said transmission and a flexible shaft between said transmission device and each of said joint actuators, a multiple disc clutch for each said joint actuator shaft and a pressure plate for each said clutch for pressing the discs thereof together to transmit power from said motor flexible shaft to said associated joint actuator shaft, and a control means cooperatively associated with said source of current, said motor and said transmission device for concurrently connecting said source of current to said motor and for operating each said pressure plate, said control means terminating in a compression spring and means for adjusting the compression of said spring to operate said associated clutch up to but short of the stalling point of said motor.

23. In a prosthetic device, a motor, a source of current for operating said motor, a muscular operated control device, an enabling switch and a reversing switch responsive to said control device, said enabling switch being operated to connect said source of current to said motor to cause said motor to rotate in one direction and said reversing switch being concurrently operated to reverse the said connections between said source of current and said motor to cause said motor to rotate in the opposite direction, said control device being responsive to a fixed muscular effort slowly and successively to operate first said enabling switch and second said reversing switch, when and if said fixed effort is extended to the limit of its range, a sensory barrier cooperatively associated with said control device encountered prior to reaching the operation of said reversing switch, said control device being responsive to a ballistic muscular effort to reach and operate said reversing switch prior to any forward rotation of said motor.

24. In a prosthetic device, a motor, a source of current for operating said motor, a muscular operated control device, an enabling switch and a reversing switch responsive to said control device, said enabling switch being operated to connect said source of current to said motor to cause said motor to rotate in one direction and said reversing switch being concurrently operated to reverse the said connections between said source of current and said motor to cause said motor to rotate in the opposite direction, said control device being responsive to a fixed muscular effort slowly and successively to operate first said enabling switch and second said reversing switch when and if said fixed effort is extended to the limit of its range, each said switch having an operating differential whereby its forward and its reverse operating movements overlap, a sensory barrier cooperatively associated with said control device encountered prior to reaching the operation of said reversing switch, said control device being responsive to a ballistic muscular effort to reach and operate said reversing switch prior to any forward rotation of said motor, and means to exaggerate the operating differential of said switches to give said reversing switch a comparatively greater range for operation than said enabling switch.

25. In a prosthetic device, the combination of a source of current, a motor, a transmission device, a plurality of joint actuators, a flexible shaft between said motor and said transmission device, a separate flexible shaft between said transmission device and each of said joint actuators, a separate multiple disc clutch in said transmission device for each of said joint actuator shafts for effectively connecting said flexible shaft between said motor and said transmission device to said associated flexible shaft between said transmission device and said joint actuator, a plurality of control means for separately or simultaneously starting said motor and enabling corresponding ones of said clutches and a circuit arrangement including a motor enabling switch for each said control means, said enabling switches being connected in parallel and each having means to connect said source of current to said motor and a dominating motor reversal switch for reversing said circuit connections between said source of current and said motor, said reversing switch being common to said control means, whereby during the simultaneous operation of a plurality of enabling switches the said motor will propel all joint actuator shafts enabled in a reverse direction responsive to the operation of said reversal switch by any one of said control means.

26. In a prosthetic device, the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts for effectively connecting said flexible shaft between said motor and said transmission device to said associated flexible shaft between said transmission device and said joint actuator, a plurality of control means each including means responsive to an amputee's muscular movement to interconnect said source of current and said motor for enabling said motor, for enabling a corresponding one of said clutches and for reversing said motor, said control means being adapted to the extent of muscular movement which may be executed by said amputee and being spring loaded to give a predetermined working force to a mucular effort whereby a uniform module of motion of any one of said joints may be executed by a ballistic muscular effort, the said extent of movement and spring loading of said control being predetermined to limit the said module of motion to a predetermined range within a practical and acceptable error.

27. In a prosthetic device, the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts for effectively connecting said flexible shaft between said motor and said transmission device to said associated flexible shaft between said transmission device and said joint actuator, a plurality of control means each including means responsive to an amputee's muscular movement to interconnect said source of current and said motor for enabling said motor, for enabling a corresponding one of said clutches and to reverse the said connections between said source of current and said motor for reversing said motor, said control means being adapted to the extent of muscular movement which may be executed by said amputee and being spring loaded to give a predetermined working force to a muscular effort whereby a uniform module of motion of any one of said joints may be executed by a ballistic muscular effort, the said module of motion being predetermined to a predictable limit with a practical degree of error.

28. In a prosthetic device, the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts, a plurality of control means each including means for enabling said motor, for reversing said motor and for enabling a corresponding one of said clutches, and means for correlating a joint operation force to a control force consisting of means to variably operate said control means against an increasingly variable resistance of one of said clutches.

29. In a prosthetic device, the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts, a plurality of control means each including means for enabling said motor, for reversing said motor and for enabling a corresponding one of said clutches, said means for enabling a said clutch consisting of a pressure plate for said clutch discs and a thrust element responsive to increasing muscular effort and terminating in a preloaded spring arranged for compression only after said pressure plate has been pressed home by a predetermined force.

30. In a prosthetic device the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts, a plurality of control means each including means for enabling said motor, for reversing said motor and for enabling a corresponding one of said clutches, said means for enabling a said clutch consisting of a pressure plate for said clutch discs and a thrust element responsive to increasing muscular effort and terminating in a preloaded spring arranged for compression only after said pressure plate has been pressed home over a predetermined range.

31. In a prosthetic device, the combination of a source of current, a motor, a transmission device, a plurality of joint actuators, a flexible shaft between said motor and said transmission device, a separate flexible shaft between said transmission device and each of said joint actuators, a multiple disc clutch in said transmission device for each of said joint actuator shafts, a plurality of control means each including means for enabling said motor, for reversing said motor and for enabling a corresponding one of said clutches, said means for enabling a said clutch consisting of a pressure plate for said clutch discs and a thrust element responsive to increasing muscular effort and terminating in a preloaded spring arranged for compression only after said pressure plate has been pressed home over a predetermined range, one of said control devices consisting of a distant shoulder cap and a near shoulder cap, a cable having one end thereof attached to said distant shoulder cap, a cable guide attached to said near shoulder cap, said cable being threaded through said cable guide, a lever attached to the other end of said cable and said thrust element attached to said lever.

32. In a prosthetic device, a thumb and finger actuator consisting of a frame element, a finger lever pivoted to said frame element substantially midway of its length, one end thereof constituting a finger moving means and the other end having a gear and a sickle shaped cam affixed thereto, a spur gear on a shaft journaled in said frame in cooperative relationship with said finger lever gear, a constant speed motor for rotating said last gear, a thumb lever pivoted to said frame element substantially midway of its length, one end thereof constituting a thumb moving means and the other end having a dog pivoted thereon, a roller fixed to said dog near the free end thereof, said roller bearing normally against said cam, a spring having one end attached to said frame and the other end attached to said dog midway between said pivot and said roller and a toothed rack mounted on said frame element in cooperative relationship with said dog.

33. In a prosthetic device, the combination of a source of current, a motor, and a finger actuator operated by said motor, a gear rotated by said motor, a pivoted finger element having a gear sector meshed with said gear and a sickle shaped cam, a pivoted thumb element, a dog pivoted on one end of said thumb element, a cam roller mounted on said dog near the free end thereof and bearing against said finger element cam, a spring for holding said roller against said cam and a toothed rack in cooperative relationship with said dog.

34. In a prosthetic device, the combination of a source of current, a motor, a clutch, a control means for operating said clutch and a finger actuator operated by said motor, a gear rotated by said motor, a pivoted finger element having a gear sector meshed with said gear and a sickle shaped cam, a pivoted thumb element, a dog pivoted on one end of said thumb element, a cam roller mounted on said dog near the free end thereof and bearing against said finger element cam, a spring for holding said roller against said cam and a toothed rack in cooperative relationship with said dog.

35. In a prosthetic device, the combination of a source of current, a motor, a multiple disc clutch, a control means for starting said motor and operating said clutch, flexible shafts between said motor and said clutch and between said clutch and a finger actuator, said finger actuator consisting of a gear rotated by said motor, a pivoted finger element having a gear sector meshed with said gear and a sickle shaped cam, a pivoted thumb element, a dog pivoted on one end of said thumb element, a cam roller mounted on said dog near the free end thereof and bearing against said finger element cam, a spring for holding said roller against said cam and a toothed rack in cooperative relationship with said dog.

36. In a prosthetic device, the combination of a Y-shaped frame, a finger lever pivoted on the end of one of the branches thereof, a thumb lever pivoted on the end of the other of the said branches thereof, a gear on a shaft journaled in said frame, a constant speed motor for rotating said gear, a gear sector meshing with said gear affixed to the inner end of said finger lever, a sickle shaped cam affixed to the inner end of said finger lever, a dog pivoted to the inner end of said thumb lever, a roller fixed to said dog near the free end thereof and bearing on said finger element cam, spring means to hold said roller tightly in contact with said cam, a stop on said dog to limit the movement thereof in a direction opposed to the thrust of said spring and a rack affixed to said frame in cooperative relationship to said dog.

37. In a prosthetic device, a thumb and finger mechanism, comprising a rotatable finger element, a rotatable thumb element, a constant speed motor for driving said finger element, means responsive to the rotation of said finger element for rotating said thumb element, whereby said finger and thumb elements may be moved together or apart at comparatively high speed and means for locking said thumb element whereby said finger and thumb elements may be moved together at comparatively low speed.

38. In a prosthetic device, a thumb and finger mechanism comprising a force multiplier whereby said thumb and fingers may be moved together at comparatively high speed with comparatively little power and responsive to obstruction to said movement through the grasping of an object to reduce said comparatively high speed and to increase said power, consisting of a pivoted finger element, a constant speed motor for rotating said finger element, a pivoted thumb element, means for imparting movement of said finger element to said thumb element and means for disabling said last means and locking said thumb element against further movement.

39. In a prosthetic device, a pincers mechanism comprising a pair of jaw elements which may be moved swiftly together with little power before an object is grasped and moved slowly together with great power after an object is grasped, consisting of a first rotatable element, a constant speed motor for rotating said first element, a second rotatable element in cooperative relationship with said first element, means for driving said second element from said first element and means for disabling said last driving means and locking said second element against further movement.

40. In a prosthetic device, a source of current, a motor operable therefrom, a transmission unit including a multiple disc clutch, a control means for simultaneously operating said clutch and effectively connecting said motor to said source of current, a flexible shaft between said motor and said multiple disc clutch in said transmission unit, a joint actuator, a reduction gear, a flexible shaft between said multiple disc clutch in said transmission unit and said reduction gear and a flexible shaft between said reduction gear and said joint actuator whereby through the operation of said control means said motor may be started in operation and said multiple disc clutch may be operated to transmit motion from said motor through said various flexible shafts to said joint actuator.

No references cited.